United States Patent [19]

Clopton

[11] Patent Number: 5,076,422
[45] Date of Patent: Dec. 31, 1991

[54] SIDE-FLEXING CHAIN WITH WHEELS

[75] Inventor: Robert T. Clopton, Magnolia, Ky.

[73] Assignee: Tekno Incorporated, Hodgenville, Ky.

[21] Appl. No.: 575,195

[22] Filed: Aug. 29, 1990

[51] Int. Cl.$^5$ .......................................... B65G 15/60
[52] U.S. Cl. ................................. 198/838; 198/845; 198/852
[58] Field of Search ................ 198/852, 853, 838, 845

[56] References Cited

U.S. PATENT DOCUMENTS

| | | | |
|---|---|---|---|
| 1,804,701 | 5/1931 | Mojonnier. | |
| 2,526,563 | 10/1950 | Keen | 198/838 X |
| 2,789,685 | 4/1957 | Orwin. | |
| 2,850,149 | 9/1958 | Bankauf | 198/838 X |
| 2,906,390 | 9/1959 | Hefti | 198/852 X |
| 3,006,456 | 10/1961 | Ferris et al. | |
| 3,308,768 | 3/1967 | Orwin | 198/838 X |
| 3,493,097 | 2/1970 | Karr | 198/852 X |
| 3,513,964 | 5/1970 | Imse. | |
| 3,529,715 | 9/1970 | Mueller. | |
| 3,575,282 | 4/1971 | Gaiotto et al. | |
| 3,589,503 | 6/1971 | Leach. | |
| 3,768,631 | 10/1973 | Wahren. | |
| 3,880,276 | 4/1975 | Willett. | |
| 3,905,304 | 9/1975 | Ord | 198/852 X |
| 3,952,860 | 4/1976 | Specht | 198/852 X |
| 4,422,544 | 12/1983 | Allredge | 198/838 |
| 4,449,758 | 5/1984 | Wohlford et al. | |
| 4,462,524 | 7/1984 | Mallet | 198/845 |
| 4,729,470 | 3/1988 | Bacigalupe et al. | 198/852 X |
| 4,793,473 | 12/1988 | Gilgore et al. | 198/852 X |
| 4,919,252 | 4/1990 | Wechner. | |

FOREIGN PATENT DOCUMENTS

| | | | |
|---|---|---|---|
| 2437209 | 6/1975 | Fed. Rep. of Germany | 198/852 |
| 2821735 | 11/1978 | Fed. Rep. of Germany | 198/852 |
| 2822196 | 11/1979 | Fed. Rep. of Germany | 198/852 |
| 1065308 | 1/1984 | U.S.S.R. | 198/852 |
| 1146246 | 3/1985 | U.S.S.R. | 198/852 |
| 2010208 | 6/1979 | United Kingdom | 198/852 |

Primary Examiner—D. Glenn Dayoan
Attorney, Agent, or Firm—Theresa Fritz Camoriano

[57] ABSTRACT

A chain link has load-carrying wheels and at least one guide wheel, and the axis of rotation of the load-carrying wheels intersects the axis of rotation of the guide wheel at a single point.

20 Claims, 3 Drawing Sheets

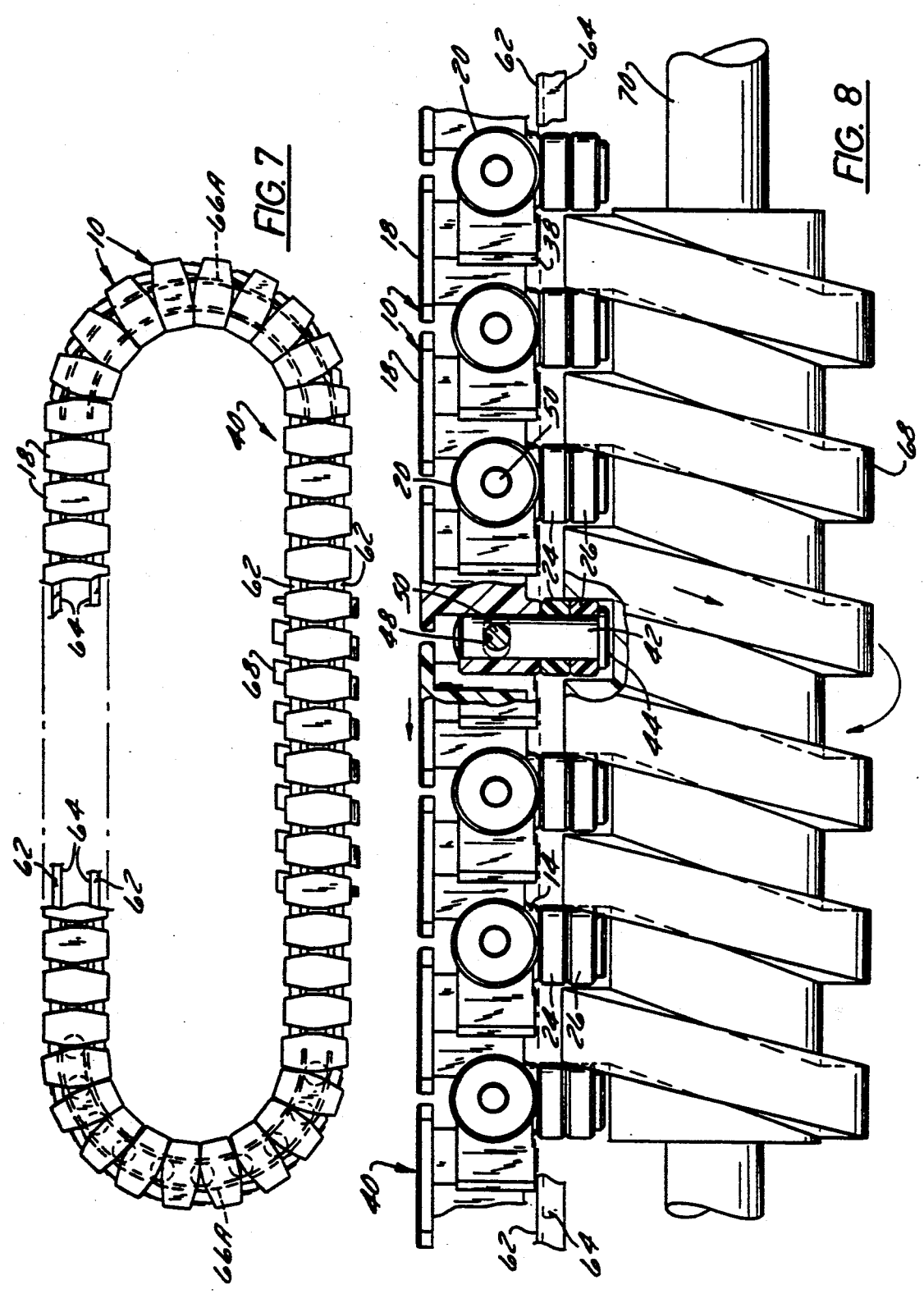

SIDE-FLEXING CHAIN WITH WHEELS

BACKGROUND OF THE INVENTION

This invention pertains to chains, and, in particular, to a side-flexing chain with wheels for supporting the weight of the chain and for guiding the chain.

Many types of chains are known in the art. Some chains have support wheels to carry the weight of the chain and guide wheels to guide the chain as it travels along a track. However, there are several problems with these chains.

The chains of this type which existed prior to the present invention could only be driven by a sprocket lying below the chain, meaning that less than half of the chain could be functioning to carry products at any given time, and the rest of the chain would be passing over the sprocket or on a return run. The cost of the extra chain and the cost of continually moving the extra chain are substantial and are essentially wasted expenses.

If the conveyors using these chains get to be too long, the chain has to be broken into pieces, each having a separate drive. The cost of the drive and its related controls is usually about one-third of the cost of the conveyor, so breaking the conveyor into parts with separate drives is very expensive.

The known chains of this type can only be pulled—they cannot be pushed. If they were pushed, they would buckle and wedge against their guide tracks.

The known chains of this type can only be driven by a sprocket, which must be at the head end of the conveyor. This is often an inconvenient location for the drive, as the ends of the conveyor are often crowded with other devices. It would be very desirable to move the drive to another part of the conveyor, but, prior to the present invention, that has not been possible.

The known chains of this type all require a catenary or some other arrangement to keep the chain tight and to compensate for any stretching of the chain during operation.

The known chains of this type generally do not provide good bearing surfaces for the joints of the chain which flex, which causes the chains to tend to wear at those joints.

SUMMARY OF THE INVENTION

The present invention overcomes many of the disadvantages of prior art chains.

The present invention provides a chain which has wheels for support and for guiding, as with some known chains, but it has several advantages over the known chains. An important advantage is that it can be driven by at least three different means. It can be driven by a sprocket lying below the chain, as in the prior art, or by a sprocket on the side of the chain (which provides the advantage that the entire top surface of the chain can be used for conveying products at any given time), or by a screw beneath the chain, which permits the entire top surface of the chain to be used for conveying and permits drives to be used at any convenient place or places along the chain, without having to break the chain into pieces when the conveyor becomes long.

The present invention permits two or more drives to be used on the same section of chain. This allows the conveyor to be as long as required for the job, and the drives can be added at spaced intervals along the chain as required in order not to exceed chain pull limits.

Unlike some prior art chains, the present invention requires only a single type of link to make the entire chain. In the prior art, it was often necessary to use two different types of chain links to form the chain—one link to carry the guide wheels and one link to carry the support wheels, for example.

In the present invention, both the guide and support wheels are located on each individual link, and the axes of the guide wheels and of a pair of pivoting support wheels on one link intersect at the same point. This permits the chain to be pushed without jamming into the guide track, which cannot be done with any of the known side-flexing chains. It is this ability to be pushed as well as pulled which permits the chain to be driven at intermediate locations along the conveyor by means such as a screw.

In addition to the benefit of being able to locate several drives along a single length of chain, a screw drive also eliminates the jerky motion of the chain caused by cordal action as the chain passes over the sprockets.

The present invention also provides an improved bearing surface for the flexible joint, which reduces wear.

The present invention also provides a means for the chain itself to compensate for stretching during use, so that no catenary take-up is required.

The present invention can operate around tight turns without requiring the use of wheel turns on the conveyor, because it has its own low friction roller guiding arrangement, and because its design permits the chain itself to make a tight turn.

The present invention also provides an improved means for retaining the chain pin on the link.

BRIEF DESCRIPTION OF THE DRAWINGS

FIG. 7 is a top view of a conveyor system in which the chain is made up of the links of FIG. 1, and the chain is driven by a screw drive;

FIG. 8 shows a broken-away side view partially in section of the system of FIG. 7;

DESCRIPTION OF THE PREFERRED EMBODIMENTS

Figure 4:
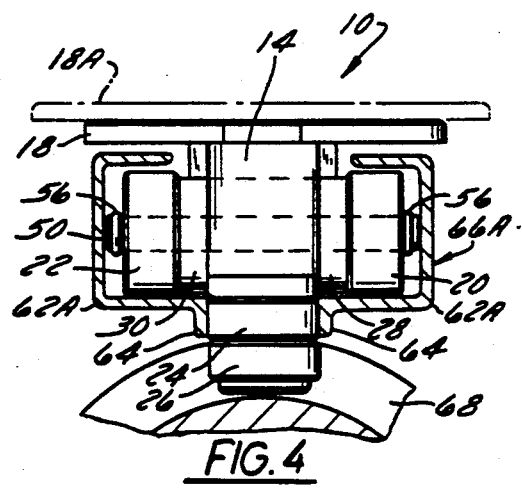
FIG. 4 is a front view of the link of FIG. 1 with an attachment added to the top surface and showing a broken-away view partially in section of the screw drive with the support and guide track shown in section.
Figure 5:
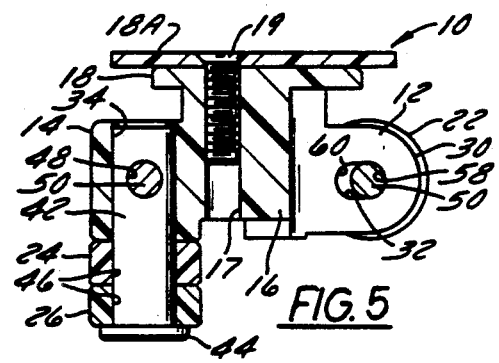
FIG. 5 is a side sectional view of the link of FIG. 1 with an attachment added to the top surface.
Figure 1:
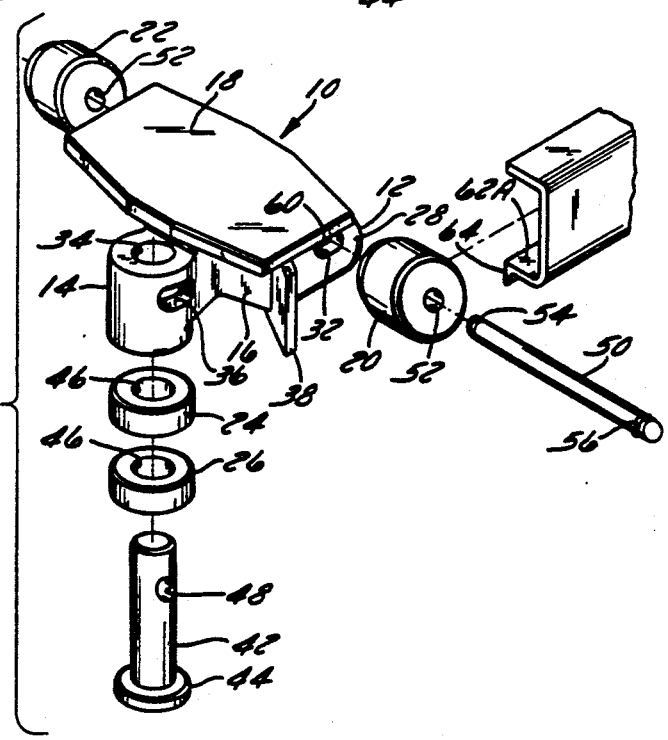
FIG. 1 is an exploded perspective view of a chain link made in accordance with the present invention.

The chain link 10 shown in FIGS. 1-5 is made up of a body 16 which has a rear portion 12 and a forward projection 14. It also has an article-carrying, flat, top surface 18. The link defines three vertical holes 17, which can be drilled out through the top surface 18 to permit other types of top surfaces to be added to it. As shown in FIGS. 4 and 5, the vertical holes 17 have been drilled through the top surface 18, and another top surface 18A has been mounted on the link by means of self-tapping screws 19. Many different configurations of top surfaces are known in the art, and it is contemplated that they could be added to this link or to a similar base link which is made without the top surface 18 by means of screws or other attachment means or by being formed integral with the link body 16.

Figure 3:
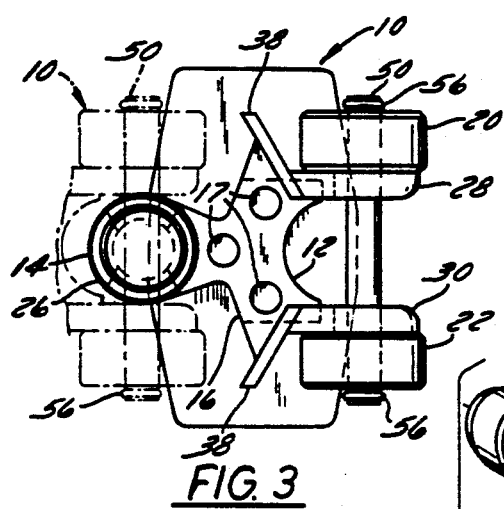
FIG. 3 is a bottom view thereof, with a portion of an identical adjacent link shown in phantom.

A pair of support wheels 20, 22 and a pair of guide wheels 24, 26 are shown mounted on the link 10. As is shown in FIG. 3, each link 10 actually has two pairs of support wheels 20, 22 mounted on it. A forward pair of support wheels 20, 22 is shared with the identical link ahead of the link 10 and pivots relative to the link 10, and a rear pair of support wheels 20, 22 is shared with the identical link behind the link 10 and does not pivot relative to the link 10. A very useful feature of this link 10 is that its forward (pivoting) pair of support wheels 20, 22 and its guide wheels 24, 26 have axes which intersect at a single point. This permits a chain made up of these links 10 to be pulled or pushed without the links 10 becoming jammed in their tracks.

The rear portion 12 of the link 10 includes a first arm 28 and a second arm 30. The first and second arms 28, 30 are spaced apart and lie parallel to each other. Each of the arms 28, 30 defines a horizontal hole 32 which is elongated from front to back, and the horizontal holes 32 of each pair of arms 28, 30 are aligned so that a chain pin can extend through the pair of holes 32. The fact that these horizontal holes 32 are elongated in the front-to-back direction means that the chain made up of the links 10 can compensate for stretching of the links 10 during operation at the discharge side of a drive unit.

The front projection 14 has a vertical cylindrical bore 34 and a horizontal bore 36 which is elongated from front-to-back to permit pivoting of the links 10 about a vertical axis relative to each other (side-flexing). The vertical bore 34 and the horizontal bore 36 intersect. The axes of those bores 34, 36 intersect at a point which lies along an imaginary plane that bisects the link 10 from front to back.

The body portion 16 of the link 10 also includes a pair of scrapers 38, which project downward from the bottom surface of the link. These scrapers 38 lie at an acute angle of about 30 degrees to the direction of travel of the link so that they will push debris toward the center of the link, where it will fall out of the track when the link is driven forward. This feature is particularly important when the chain 40 made up of these links is used in an assembly operation, where loose pieces such as screws and bits of dirt tend to fall onto the track on which the chain runs. Many other chains tend to jam and fail when these loose pieces get wedged into the chain or between the chain and the track. These scrapers 38 help solve that problem by pushing the debris off of the track.

In order to assemble the links 10 into a chain 40, two types of pins are used. A vertical pin 42, having a head 44 at its lower end, is extended through the vertical bore 34 of the front projection 14 of each link and through the central cylindrical bores 46 in the guide wheels 24, 26. The vertical pin 42 has a transverse cylindrical bore 48, the axis of which is perpendicular to the axis of the pin 42.

Each link also has a chain pin 50, which extends through the central cylindrical bore 52 of one support wheel 20, through one of the spaced-apart arms 28, through the horizontal bore 36 in the forward projection 14 of the adjacent identical link and through the transverse bore 48 in the vertical pin 42 of that adjacent link, and through the horizontal hole 32 in the other arm 30 and through the central bore 52 of the other support wheel 22. The ends of the chain pin 50 define annular grooves 54, which receive O-rings 56, preferably made of Teflon or some other low-friction material, to retain the chain pin 50 on the chain. The annular grooves 54 are radiused to fit the O-rings.

When the links 10 are being assembled to make a chain 40 for a conveyor system, the chain 40 is made to a length which fits tightly into the conveyor frame. When the chain 40 is stretched tight, the chain pins 50 will be bearing against the rear semi-cylindrical surface 58 of the horizontal holes 32 in the arms 28, 30 of each link 10. As the chain links 10 stretch slightly during operation of the conveyor, the chain pins 50 can move forward in the holes 32 until they abut the forward semi-cylindrical surface 60 of the horizontal holes 32, so the length of the chain remains constant, even when the links stretch. This ability of the chain to automatically adjust its length to compensate for stretching eliminates the need for a catenary or other type of take-up arrangement at the discharge side of the drives.

Figure 6:
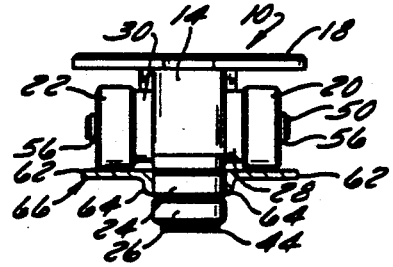
FIG. 6 is a front view of the link of FIG. 1 with a different type of guide track shown in section.

FIGS. 7-10 show three different conveyor systems using the chain 40. All of the conveyor frames in those systems include a pair of support rails 62 or 62A and a pair of guide rails 64, with the support surface of the support rails 62 or 62A lying perpendicular to the guide rails 64. Two types of support rails 62, 62A are shown in the drawings. As shown in FIG. 4, the support rails 62A wrap around the support wheels 20, 22, to keep the support wheels from lifting up out of the track. This is needed in horizontal and vertical turns and through the screw drive. A simpler type of support rail 62, shown in FIG. 6, can be used for straight runs. The support rail 62 or 62A and guide rail 64 are preferably made of a single beam 66 or 66A, as shown in FIGS. 4 and 6. The guide rails 64 are spaced apart a distance which is slightly larger than the diameter of the guide wheels 24, 26. If the chain 40 is to be driven by a screw 68, as shown in FIGS. 4 and 8, the guide rails 64 have a height which is approximately equal to the height of one of the guide wheels 24, and the upper guide wheels 24 ride between the guide rails 64 along the conveyor path. The lower guide wheels 26 extend below the guide rails 64 in order to contact the drive screw 68.

Figure 2:
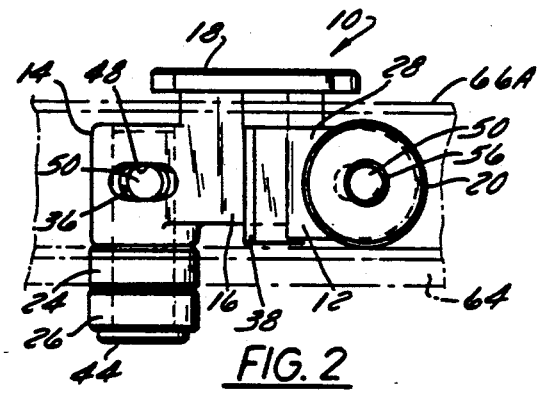
FIG. 2 is a side view thereof, showing the support track in phantom.

The support rails 62, 62A are wide enough to receive the support wheels 20, 22. The scrapers 38 project downward from the chain slightly less than do the support wheels 20, 22, so they travel just above the support surface of the support rails 62, as shown in FIG. 2. The beams 66, or 66A, which include the guide rails 64 and support rails 62 or 62A are usually welded or bolted onto a conveyor frame in a manner known in the art.

The conveyor system in FIGS. 7 and 8 shows the preferred method of driving the chain 40, by means of a drive screw 68. The drive screw 68 is mounted on a drive shaft 70, which extends beneath the chain 40 with its axis parallel to the direction of travel. When the drive shaft 70 rotates in a counter-clockwise direction as indicated by the arrow in FIG. 8, it pushes the lower guide wheels 26 and drives the chain 40 to the left. The drive screw 68 imparts some lateral force to the links 10, but the guide rails 64 keep the chain 40 travelling along a straight forward path. Since this drive screw 68 is located somewhere in the middle of the conveyor, it is pulling part of the chain 40 and pushing part of the chain 40. This would not be possible with other chain designs, because, if they were pushed, they would buckle and get wedged in the guide rails 64. However, with this chain, since each link carries its own guide wheels and support wheels, and since the axes of the pair of pivoting support wheels (or load-carrying wheels) and of the guide wheels for each link intersect at the same point, this chain can be pushed or pulled without becoming wedged against the guide rails 64. Therefore, it is also possible to reverse the direction of this conveyor by reversing the direction of rotation of the screw and driving the chain 40 backwards, again with no jamming problems. However, if the chain 40 is driven backwards, the scrapers 38 will not serve their function of clearing debris from the tracks 66, 66A as efficiently as they do in the forward direction.

The conveyor system shown in FIG. 7 shows the chain 40 making lateral curves at both ends of the conveyor. It is contemplated that the chain may make such curves at various positions along its length as needed to perform its functions. For example, the chain 40 may travel up and down several bays to make a closed loop throughout an entire assembly plant. One of the advantages of this chain is that it can make tight lateral turns without requiring the use of a wheel turn. A chain made up of the links of FIG. 1, when made in a two-inch pitch size (the pitch being the distance between the axes of the chain pins), can make a lateral turn having a radius of 5.75 inches. (The radius of the turn is measured from the center of the turn to the centerline of the chain.) This is a much tighter turn than can be made with most existing chains.

Figure 9:
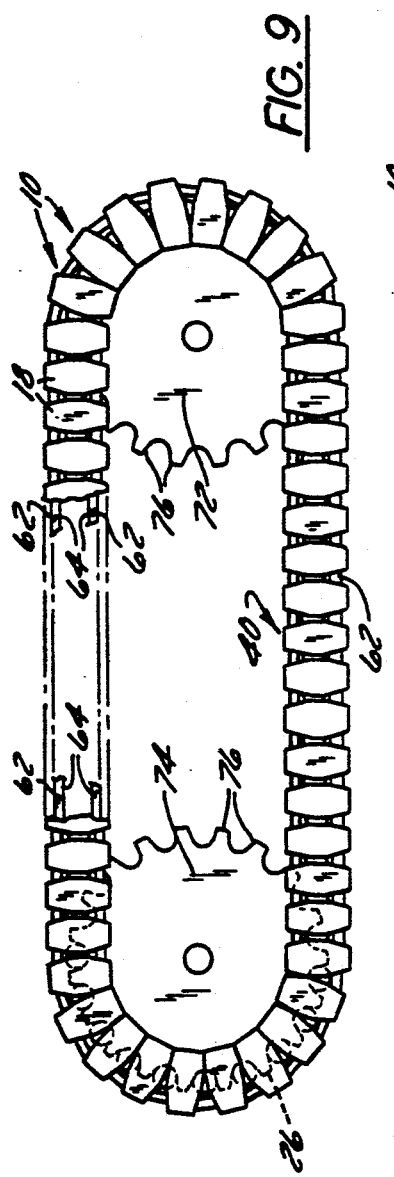
FIG. 9 is a top view of a conveyor system including a chain made up of the links of FIG. 1 being driven by a sprocket rotating about a vertical axis.

The conveyor system shown in FIG. 9 shares with the screw drive arrangement the advantage that the entire chain 40 can be used for conveying at any one time. This is very important, because it means that the same amount of conveying can be done with half the amount of chain. In this case, the drive sprocket 72 and the idler sprocket 74 rotate about vertical axes. Actually, an idler sprocket is not required, because the chain could simply be guided around a curved track 66A at that end. The sprocket teeth 76 engage the lower guide wheels 26 on the links 10 to drive the chain 40.

Figure 10:
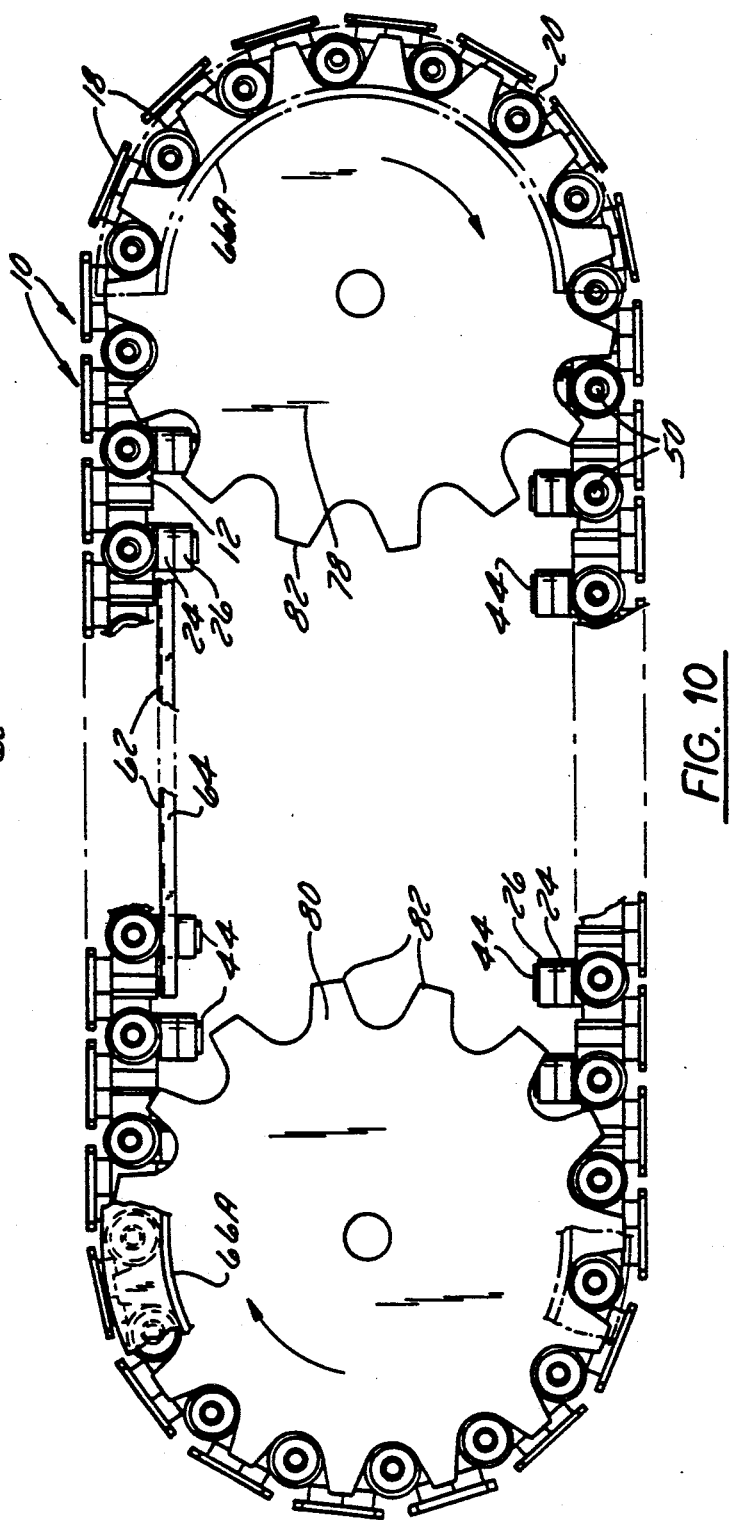
FIG. 10 is a side view partially broken away of a conveyor system including a chain made up of the links of FIG. 1 being driven by a pair of sprockets rotating about a horizontal axis.

FIG. 10 shows the chain 40 being driven in a more conventional manner, by a drive sprocket 78 which rotates about a horizontal axis. The drive sprocket 78 is actually a double sprocket, that is two sprockets rotating about the same axis. The sprocket teeth 82 engage the support wheels 20, 22 of each link to drive the chain forward, and, of course, the idler sprocket 80, which also rotates about a horizontal axis, also has teeth 82 that engage the support wheels 20, 22. Again, the idler sprocket is not required, because the guide track can simply be curved to guide the chain around that end of the conveyor. This chain 40 is designed so that it can be driven by standard off-the-shelf sprockets. As with the other conveyor arrangements, the support wheels 20, 22 ride on the support rails 62, 62A, and the guide wheels 24, 26 fit between the guide rails 64. However, with this drive arrangement, only one guide wheel is required per link, since the lower guide wheel is not needed for driving the link as in the other drive arrangements. In this arrangement, less than half of the chain can be used to convey products at any given time, because the rest of the chain is passing over the drive and idler sprockets 78, 80 or is on the return run below the top surface of the conveyor. However, even in this arrangement, the chain 40 has many advantages over prior art chains. For example, only a single type of link 10 is required to form the chain, whereas the prior art generally requires two types of links—one to carry the guide wheels and one to carry the support wheels. It has a superior bearing arrangement for the flexing portion of the chain, because the chain pin 50 is fixed in the vertical pin 42, and, when the links 10 flex relative to each other, they use the entire cylindrical bearing surface between the vertical pin 42 and the vertical bore 34 to bear the forces, whereas prior art designs depended on the chain pin shifting in an elongated bore in the links, which provided a much smaller bearing surface area. Also, the arrangement for pin retention in this design is improved over chains which require cotter pins or other retention devices which can break or fall out and which do not provide as good a bearing surface as do the O-ring retainers in the present design.

It will be obvious to those skilled in the art that many modifications may be made to the embodiments described above without departing from the scope of the present invention.

What is claimed is:

1. A chain link, comprising:
    a link body, including a rear portion having first and second parallel, spaced-apart arms, each of said arms defining a horizontal hole which is aligned with the horizontal hole in the other of said arms;
    a forward projection, defining a vertical bore and a horizontal bore which intersect each other, said forward projection being sized to fit between the spaced-apart arms of an identical adjacent link;
    first and second load-carrying wheels, each of said load-carrying wheels defining a central bore and lying adjacent to its respective spaced-apart arm;
    a chain pin extending horizontally through the central bores of said first and second load-carrying wheels and through the aligned horizontal holes in said spaced-apart arms, so that said load-carrying wheels rotate about a horizontal axis;
    at least one guide wheel, defining a central bore;
    a vertical pin extending through the vertical bore of the forward projection and through the central bore of the guide wheel, said vertical pin defining a vertical axis such that said guide wheel can rotate about said vertical axis.

2. A chain link as recited in claim 1, wherein the vertical bore of the forward projection defines a vertical axis which lies on an imaginary vertical plane that bisects the link longitudinally, from front to rear.

3. A chain link as recited in claim 2, wherein the horizontal bore of said forward projection is elongated from front to back to permit the link to rotate about a vertical axis relative to an adjacent identical link; and wherein the vertical pin defines a horizontal bore adapted to be aligned with the horizontal bore of the forward projection and sized to receive the chain pin with a close fit.

4. A chain link as recited in claim 3, wherein the aligned horizontal holes in the spaced-apart arms are elongated from front to back to permit a chain made of these links to automatically adjust its length to compensate for stretching of the links during operation.

5. A chain link as recited in claim 1, and further comprising a second guide wheel lying adjacent to the one guide wheel and mounted on the vertical pin.

6. A chain link as recited in claim 1, wherein said link body has a bottom surface and further comprising left and right scrapers projecting from the bottom surface of said link body, each of said scrapers lying at an angle so as to push debris toward the center of the link when the link is driven forward.

7. A chain link as recited in claim 1, wherein said chain pin has two ends and defines an annular groove in its outer surface at each end, and further comprising a pair of O-rings which are received in their respective annular grooves to retain the chain pin on the link.

8. A chain link as recited in claim 7, wherein said O-rings are made of a low friction material.

9. A chain, comprising:
a plurality of chain links, each of said chain links including a link body which includes a rear portion having first and second parallel, spaced-apart arms, each of said arms defining a horizontal hole which is aligned with the horizontal hole in the other of said arms;
a forward projection, defining a vertical bore and a horizontal bore which intersect with each other;
first and second load-carrying wheels, each of said load-carrying wheels defining a central bore and lying adjacent to its respective spaced-apart arm; and
at least one guide wheel defining a central bore;
wherein the forward projection of one link fits between the spaced-apart arms of its identical adjacent link, with its horizontal bore aligned with the horizontal holes in the arms of the adjacent link;
a plurality of chain pins, each of said chain pins extending through the central bores of the first and second load-carrying wheels of one link, through the aligned horizontal holes in the spaced-apart arms of the one link, and through the horizontal bore in the forward projection of an identical adjacent link, so that said load-carrying wheels rotate about a horizontal axis; and
a plurality of vertical pins, each of said vertical pins extending through the vertical bore of the forward projection of one chain link and through the central bore of the guide wheel for that one link, wherein the axis of each vertical pin intersects the axis of the chain pin which extends horizontally through the same forward projection.

10. A chain as recited in claim 9, wherein the horizontal bores of the forward projections of said links are elongated from front to back to permit each link to pivot about a vertical axis relative to its adjacent identical link; and wherein each vertical pin defines a horizontal bore which receives the chain pin with a close fit.

11. A chain as recited in claim 10, wherein the vertical bore of each forward projection defines an axis which lies on an imaginary vertical plane that bisects the link longitudinally, from front to rear.

12. A chain as recited in claim 11, wherein the aligned horizontal holes in the spaced-apart arms are elongated from front to back to permit the chain to automatically adjust its length to compensate for stretching of the links during operation.

13. A chain as recited in claim 9, and wherein each link further comprises a second guide wheel having a central opening mounted on the vertical pin of that link adjacent to the one guide wheel.

14. A chain as recited in claim 9, and further comprising left and right scrapers projecting from the lower surface of each link body, each of said scrapers lying at an angle so as to push debris away from the chain when the chain is driven forward.

15. A chain as recited in claim 9, wherein each chain pin has two ends and defines an annular groove in its outer surface at each end, and further comprising a pair of O-rings for each chain pin, said O-rings being received in their respective annular grooves to retain the chain pin on each link.

16. A chain as recited in claim 15, wherein said O-rings are made of a low friction material.

17. A conveyor, comprising:
a conveyor frame, including a substantially flat support surface adapted to support the weight of a chain; and a guide surface lying substantially perpendicular to the support surface;
a chain, comprising
a. a plurality of chain links, each of said chain links including
i. a rear portion, including first and second parallel, spaced-apart arms, each of said arms defining a horizontal hole which is aligned with the horizontal hole in the other of said arms;
ii. a forward projection, defining a vertical bore and a horizontal bore which intersect with each other;
iii. first and second load-carrying wheels, each of said load-carrying wheels defining a central bore and lying adjacent to its respective spaced-apart arm; and
iv. at least one guide wheel defining a central bore;
wherein the forward projection of one link fits between he spaced-apart arms of its identical adjacent link, with its horizontal bore aligned with the horizontal holes in the arms of the adjacent link;
b. a plurality of chain pins, each of said chain pins extending through the central bores of the first and second load-carrying wheels of one link, through the aligned horizontal holes in the spaced-apart arms of the one link, and through the horizontal bore in the forward projection of an identical adjacent link, so that said load-carrying wheels rotate about a horizontal axis and ride on said support surface; and
c. a plurality of vertical pins, each of said vertical pins extending through the vertical bore of the forward projection of one chain link and through the central bore of the guide wheel for that one link, so that the guide wheel rotates about a vertical axis and rides on said guide surface; and
means for driving said chain along said conveyor frame.

18. A conveyor as recited in claim 17, wherein said means for driving said chain includes a screw which lies below the flat support surface of the conveyor frame and contacts the guide wheels of the chain links.

19. A conveyor as recited in claim 17, wherein said means for driving said chain includes a sprocket rotating about a vertical axis, said sprocket having teeth which contact the guide wheels of the links.

20. A conveyor as recited in claim 17, wherein said means for driving said chain includes a sprocket rotating about a horizontal axis, said sprocket having teeth which contact the load-carrying wheels of the links.

* * * * *